US009407376B2

(12) United States Patent
Lyubomirsky (10) Patent No.: US 9,407,376 B2
(45) Date of Patent: Aug. 2, 2016

(54) POLARIZATION DEMULTIPLEXING OF OPTICAL SIGNALS

(71) Applicant: FINISAR CORPORATION, Sunnyvale, CA (US)

(72) Inventor: Ilya Lyubomirsky, Pleasanton, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 10 days.

(21) Appl. No.: 14/527,349

(22) Filed: Oct. 29, 2014

(65) Prior Publication Data

US 2015/0117872 A1    Apr. 30, 2015

Related U.S. Application Data

(60) Provisional application No. 61/897,147, filed on Oct. 29, 2013.

(51) Int. Cl.
*H04B 10/61* (2013.01)
*H04J 14/06* (2006.01)

(52) U.S. Cl.
CPC ............ *H04B 10/614* (2013.01); *H04B 10/616* (2013.01); *H04B 10/6151* (2013.01); *H04J 14/06* (2013.01)

(58) Field of Classification Search
CPC .................. H04B 10/532–10/563; H04J 14/06
USPC .............................. 398/65, 152, 184, 202–214
See application file for complete search history.

(56) References Cited

U.S. PATENT DOCUMENTS

| | | | | |
|---|---|---|---|---|
| 5,619,368 A | * | 4/1997 | Swanson | G02F 1/3536 359/326 |
| 5,659,412 A | * | 8/1997 | Hakki | H04B 10/2569 398/152 |
| 6,038,357 A | * | 3/2000 | Pan | H04J 14/02 385/11 |
| 6,538,787 B1 | * | 3/2003 | Moeller | G02B 6/272 359/249 |
| 7,067,795 B1 | * | 6/2006 | Yan | G02F 1/0123 250/225 |

(Continued)

*Primary Examiner* — Li Liu
(74) *Attorney, Agent, or Firm* — Maschoff Brennan (57) ABSTRACT

An example embodiment includes optical receiver that includes a polarization beam splitter (PBS), a polarization controller, and a forward error correction (FEC). The PBS is configured to split a received optical signal having an unknown polarization state into two orthogonal polarizations (x'-polarization and y'-polarization). The polarization controller includes no more than two couplers and no more than two phase shifters per wavelength channel of the x'-polarization and the y'-polarization. The polarization controller is configured to demultiplex the x'-polarization and the y'-polarization into a first demultiplexed signal having an first polarization on which a data signal is modulated and a second demultiplexed signal having a second, orthogonal polarization on which a pilot carrier oscillator signal is encoded. The FEC decoder module is configured to correct a burst of errors resulting from resetting one of the phase shifters based on error correction code (ECC) data encoded in the data signal.

18 Claims, 4 Drawing Sheets

(56) References Cited

U.S. PATENT DOCUMENTS

| | | | | |
|---|---|---|---|---|
| 7,307,722 B2 * | 12/2007 | Martinelli | G02F 1/0136 | 356/365 |
| 7,443,504 B2 * | 10/2008 | Sone | G01J 4/04 | 356/365 |
| 7,486,895 B2 * | 2/2009 | Werner | H04B 10/2569 | 385/11 |
| 7,528,360 B2 * | 5/2009 | Martinelli | G02B 6/2713 | 250/225 |
| 8,005,360 B2 * | 8/2011 | Xie | H04B 10/2569 | 398/147 |
| 2002/0003641 A1 * | 1/2002 | Hall | H04B 10/532 | 398/65 |
| 2002/0181056 A1 * | 12/2002 | Schemmann | H04B 10/2513 | 398/158 |
| 2002/0186435 A1 * | 12/2002 | Shpantzer | H04B 10/2543 | 398/99 |
| 2003/0021514 A1 * | 1/2003 | Ito | H04B 10/2569 | 385/11 |
| 2005/0265728 A1 * | 12/2005 | Yao | H04J 14/06 | 398/152 |
| 2007/0134001 A1 * | 6/2007 | Kim | H04B 10/532 | 398/155 |
| 2007/0223078 A1 * | 9/2007 | Yao | G01J 4/00 | 359/259 |
| 2008/0138070 A1 * | 6/2008 | Yan | H04J 14/06 | 398/65 |
| 2008/0232816 A1 * | 9/2008 | Hoshida | H04J 14/06 | 398/152 |
| 2009/0190930 A1 * | 7/2009 | Von Der Weid | H04B 10/2569 | 398/81 |
| 2010/0021163 A1 * | 1/2010 | Shieh | H04B 10/60 | 398/65 |
| 2010/0092176 A1 * | 4/2010 | Hartog | H04B 10/64 | 398/79 |
| 2010/0098420 A1 * | 4/2010 | Ibragimov | H04J 14/06 | 398/65 |
| 2010/0111530 A1 * | 5/2010 | Shen | H04J 14/06 | 398/65 |
| 2010/0166423 A1 * | 7/2010 | Chang | H04J 14/06 | 398/65 |
| 2010/0322628 A1 * | 12/2010 | Nagarajan | G02B 6/12004 | 398/65 |
| 2012/0002971 A1 * | 1/2012 | Doerr | G02B 6/124 | 398/115 |

* cited by examiner

POLARIZATION DEMULTIPLEXING OF OPTICAL SIGNALS

RELATED APPLICATION

This application claims priority to and the benefit of U.S. Provisional Application No. 61/897,147, which is incorporated herein by reference in its entirety.

FIELD

The embodiments discussed herein are related to polarization demultiplexing of optical signals. In particular, some embodiments relate to polarization demultiplexing in pilot carrier single polarization quadrature phase shift keying optical signals.

SUMMARY

This Summary is provided to introduce a selection of concepts in a simplified form that are further described below. This Summary is not intended to identify key features of the claimed subject matter, nor is it intended to be used as an aid in determining the scope of the claimed subject matter.

An example embodiment includes optical receiver. The optical receiver includes a polarization beam splitter (PBS), a polarization controller, and a forward error correction (FEC) module. The PBS is configured to split a received optical signal having an unknown polarization state into two orthogonal polarizations (x'-polarization and y'-polarization). The polarization controller includes no more than two couplers and no more than two phase shifters per wavelength channel of the x'-polarization and the y'-polarization. The polarization controller is configured to demultiplex the x'-polarization and the y'-polarization into a first demultiplexed signal having an first polarization on which a data signal is modulated and a second demultiplexed signal having a second polarization that is orthogonal to the first polarization on which a pilot carrier oscillator signal is encoded. The FEC decoder module is configured to correct a burst of errors resulting from resetting one of the phase shifters based on error correction code (ECC) data encoded in the data signal.

Another example embodiment includes an optical communication link. The optical communication link includes an optical transmitter, an optical receiver, and a fiber. The optical transmitter includes an FEC encoder module, a modulator, a laser, a pilot encoder module, and a polarization beam combiner. The FEC encoder module is configured to encode ECC data on a data signal. The modulator is configured to modulate the data signal onto a first polarization of an optical signal. The pilot encoder module is configured to encode a pilot carrier oscillator signal onto a second polarization of the optical signal. The optical receiver includes a PBS, a polarization controller, and an FEC decoder module. The PBS is configured to split a received optical signal having an unknown polarization state into two orthogonal polarizations (x'-polarization and y'-polarization). The polarization controller includes no more than two couplers and no more than two phase shifters. The FEC decoder module is configured to correct a burst of errors resulting from resetting one of the phase shifters based on the ECC data encoded in the data signal. The fiber optically couples the optical transmitter to the optical receiver.

Another example embodiment includes method of polarization demultiplexing. The method includes splitting a received optical signal having an unknown polarization state into two orthogonal polarizations (x'-polarization and y'-polarization). The method includes phase shifting either the x'-polarization or the y'-polarization according to a first rotation angle. The method includes generating a third signal and a fourth signal, each of the third signal and the fourth signal being a combination of a phase shifted first signal and the other of the x'-polarization or the y'-polarization. The method includes phase shifting the third signal according to a second rotation angle. The method includes generating a first demultiplexed signal and a second demultiplexed signal, each of the first demultiplexed signal and the second demultiplexed signal including a combination of a phase shifted third signal and the fourth signal. The method includes outputting the first demultiplexed signal and the second demultiplexed signal.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BACKGROUND

Dense wavelength division multiplexing (DWDM) may be used to increase bandwidth in optical communication links. In systems implementing DWDM, multiple optical signals may be combined and transmitted on the same optical fiber simultaneously. Each of the optical signals has different wavelengths. In effect, one fiber is transformed into multiple virtual fibers. Communication networks that implement DWDM networks can carry different types of traffic at different speeds.

An example of a communication network that implements DWDM may be referred to as a metro DWDM communication network. The metro DWDM communication network may be installed to serve cities or metropolitan areas. The metro DWDM communication network may communicate data hundreds of kilometers.

In communication networks implementing DWDM such as the metro DWDM communication network, chromatic dispersion may occur. Chromatic dispersion may result in pulse broadening and an increase in bit errors, for instance. Chromatic dispersion may result from the physical properties of the optical fibers and the optical signals and may act to effectively slow the feasible baud rate of optical signals.

Optical polarization multiplexing can be used to double the data capacity of each wavelength channel or to transmit pilot carrier oscillator signals to aid in detection. In systems implementing optical polarization multiplexing, optical signal state of polarization (SOP) may be rotated by the fiber birefringence, which may require some form of polarization control or demultiplexing at the receiver. Polarization demultiplexing is accomplished using digital signal processing multi-input multi-output (DSP MIMO) processing in digital coherent receivers. One type of receiver that performs the polarization demultiplexing is referred to as digital coherent receivers. The digital coherent receivers use a local oscillator laser, and the DSP MIMO. However, the local oscillator laser increases the cost of the digital coherent receivers and the DSP MIMO processing increases the power dissipation of the transceiver. An efficient scheme for polarization control/demultiplexing in the optical domain may enable single polarization coherent receivers based on pilot carrier with lower cost and lower power use.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Conventional understanding of polarization controllers is that a system may include endless polarization control and redundant phase shifters to eliminate errors during the reset of phase shifters. For example, a polarization controller including endless polarization control is discussed in Noe et al., *Endless Polarization Control Systems for Coherent Optics*, J. OF LIGHTWAVE TECH., Vol. 6, No. 7, July 1988, pp. 1199-1208, which is herein incorporated by reference in its entirety. However, the redundant phase shifters may increase the insertion loss of the system and controlling the redundant phase shifters may increase complexity of a control system.

An example embodiment disclosed herein includes an optical receiver that breaks with this conventional understanding. The optical receiver includes a polarization controller with only two phase shifters or only two phase shifters per wavelength channel. The polarization controllers have non-endless polarization control, but can nevertheless provide reliable communications by taking advantage of forward error correction (FEC) coding and/or decoding. When one of the two phase shifters resets, a resulting burst of errors is corrected by an FEC decoding module. The optical receiver simplifies the optical polarization demultiplexing and reduces insertion losses when compared to polarization controllers with endless polarization control. This and other embodiments are described herein with reference to the accompanying drawings.

Figure 1:
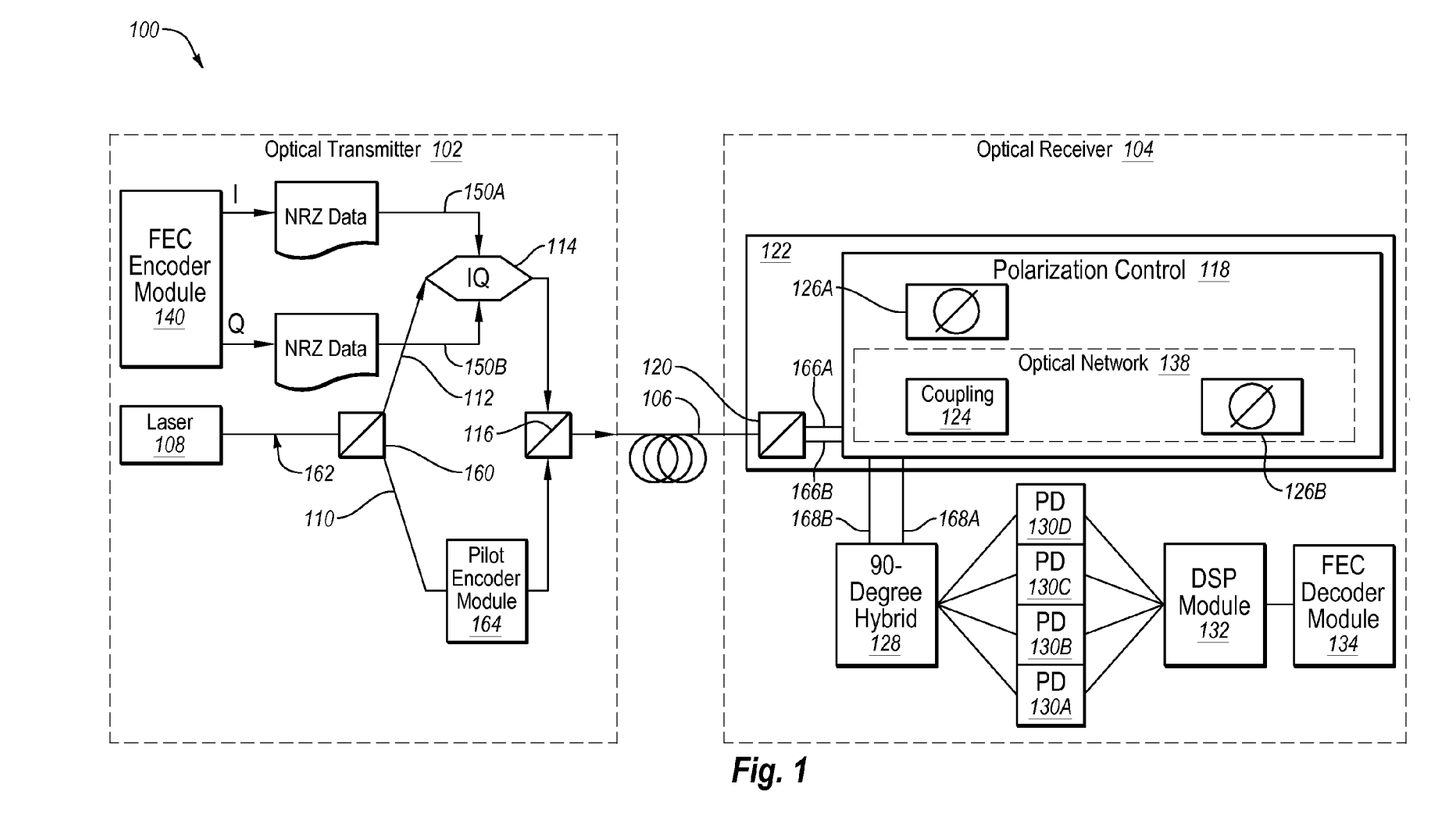
FIG. 1 illustrates a block diagram of an example communication link, in which some embodiments described herein may be implemented.

FIG. 1 illustrates a block diagram of an example optical communication link (link) 100, in which some embodiments may be implemented. The link 100 depicts a single wavelength channel that may be configured to communicate data-carrying optical signals (optical signals).

The link 100 depicted in FIG. 1 includes an optical transmitter (transmitter) 102 optically coupled to an optical receiver (receiver) 104 via a single mode fiber (SMF) 106. The transmitter 102 may be configured to generate the optical signal. In particular the transmitter 102 may be configured to modulate a data signal on a first polarization of the optical signal and to encode a pilot carrier oscillator signal (pilot carrier signal) on a second polarization of the optical signal.

The transmitter 102 depicted in FIG. 1 includes an example of a pilot carrier single polarization quadrature phase-shift keying (PCSP QPSK) transmitter. Accordingly, the transmitter 102 is configured to generate and transmit the optical signal on which QPSK data is modulated on the first polarization and a pilot carrier signal is encoded on the second polarization.

In some embodiments, the transmitter 102 may include a higher order quadrature amplitude modulation (QAM) transmitter (e.g., 8 QAM, 16 QAM, 32 QAM, etc.) or configured for another carrier modulation format including, for example, amplitude-shift keying (ASK), phase-shift keying (PSK), frequency-shift keying (FSK), minimum-shift keying (MSK), Gaussian MSK (GMSK), continuous-phase FSK (CPFSK), multiple FSK (MFSK), or another modulation format.

In some QPSK systems, to receive and interpret data from optical signals, a local oscillator, such as a local oscillator laser, may be included at a receiver (e.g., the receiver 104). The local oscillator is used to mix with the optical signal for coherent detection of the QPSK data in the optical signal. In the link 100, instead of the local oscillator being included in the receiver 104, a pilot carrier signal may be encoded in one of two polarizations of the optical signal. In particular, the pilot carrier signal may be encoded in the optical signal at the transmitter 102.

For example, in the link 100, the transmitter 102 includes a laser 108. The laser 108 may be configured to generate a continuous wave (CW) optical signal, which may be output by the laser 108, which is represented in FIG. 1 at 162. Some examples of the laser 108 might include an external cavity laser or a distributed feedback (DFB) laser.

The CW optical signal 162 may be split at a beam splitter 160 into an x-polarization 112 and a y-polarization 110. The x-polarization 112 and the y-polarization 110 may be defined according to a coordinate system of the transmitter 102, however, the designation as "x" and "y" are not necessarily meaningful other than the implication that the x-polarization 112 is substantially orthogonal to the y-polarization 110.

A CW pilot carrier signal may be encoded on the y-polarization 110 by a pilot encoder module 164. The x-polarization 112 may be communicated to an in-phase and quadrature (IQ) modulator 114 (in FIG. 1 "IQ"). At the IQ modulator 114, two independent electrical tributaries 150A and 150B (in FIG. 1, "I" and "Q") of non-return-to-zero (NRZ) data are modulated into a QPSK optical signal on the x-polarization 112 at the IQ modulator 114. In some embodiments, the QPSK signal may include a symbol rate of about 28 gigabaud (GBaud) or any other suitable symbol rate.

The transmitter 102 may also include an FEC encoder module 140. The FEC encoder module 140 may be configured to encode error-correcting code (ECC) data into one or both of the tributaries 150A and/or 150B of the NRZ data. The ECC data may be used for error correction of the optical signal representative of the NRZ data at the receiver 104.

The x-polarization 112, which includes the QPSK signal, may exit the IQ modulator 114 and may be recombined with the y-polarization 110 at a polarization beam combiner 116. The optical signal including the y-polarization 110 and the x-polarization 112 may then be communicated via the SMF 106 to the receiver 104.

Before the optical signal is received and/or processed by the receiver 104, the polarization state of the optical signal may be altered. For example, birefringence in the SMF 106 may alter the polarization state of the optical signal as the optical signal propagates through the SMF 106. In some circumstances, a model of fiber birefringence may be represented by an example fiber birefringence expression:

$$U = \begin{pmatrix} \cos\left(\frac{\theta}{2}\right) - jr_1\sin\left(\frac{\theta}{2}\right) & -(r_3 + jr_2)\sin\left(\frac{\theta}{2}\right) \\ -(r_3 + jr_2)\sin\left(\frac{\theta}{2}\right) & \cos\left(\frac{\theta}{2}\right) - jr_1\sin\left(\frac{\theta}{2}\right) \end{pmatrix}$$

In the birefringence expression, U is a 2×2 matrix representing the birefringence experienced in a fiber. The parameter j represents the imaginary number. The parameters $r_1, r_2$, and $r_3$ represent components of a unit Stokes vector r. The parameter θ represents a rotation angle about the unit Stokes vector. Accordingly, the optical signal received by the receiver may include an unknown polarization state.

The receiver 104 and/or one or more components included therein may be configured to perform a polarization demultiplexing of the optical signal received at the receiver 104 having an unknown polarization state.

The receiver 104 includes a polarization beam splitter (PBS) 120. An example of the PBS 120 may include a grating. The PBS 120 may be optically coupled to the SMF 106. The optical signal having the unknown polarization state exiting the SMF 106 may be separated by the PBS 120 into two orthogonal polarizations. The orthogonal polarizations may include an x'-polarization 166A and a y'-polarization 166B. The x'-polarization 166A and the y'-polarization 166B may be defined according to a coordinate system defined in a reference frame of the receiver 104.

If, hypothetically, there is no birefringence in the SMF 106, then the x'-polarization 166A and the y'-polarization 166B exiting the PBS 120 may match the transmitted x-polarization 112 and y-polarization 110 in the reference frame of the transmitter. However, due to birefringence of the SMF 106, the x'-polarization 166A and the y'-polarization 166B output of PBS 120 may include some mixtures of the transmitted polarization states (e.g., the y-polarization 110 and the x-polarization 112) after being rotated by the fiber birefringence (e.g. matrix U above).

Accordingly, the polarization demultiplexing performed by the receiver 104 or components therein may generally receive the x'-polarization 166A and the y'-polarization 166B and generate a first demultiplexed signal 168A and a second demultiplexed signal 168B (generally, demultiplexed signal 168 or demultiplexed signals 168). The first demultiplexed signal 168A and the second demultiplexed signal 168B may be substantially similar the transmitted x-polarization 112 including encoded QPSK signal and y-polarization 110 including the pilot carrier signal. As mentioned above, the pilot carrier signal may be used in place of a local oscillator implemented in digital coherent receivers.

The receiver 104 includes a polarization controller 118 configured to receive the x'-polarization 166A and the y'-polarization 166B exiting the PBS 120. The polarization controller 118 may include an optical network 138 and one or more phase shifters 126A and 126B (generally, phase shifter 126 or phase shifters 126). In the depicted embodiment, the optical network 138 includes a second phase shifter 126B and a coupling 124 such as a 50/50 splitter. The optical network 138 and the one or more phase shifters 126 may demultiplex the x'-polarization 166A and the y'-polarization 166B exiting the PBS 120. The polarization controller 118 may then output demultiplexed signals 168.

For example, the polarization controller 118 may include a first phase shifter 126A and the optical network 138. The polarization controller 118 may accordingly include the optical network 138 and the first phase shifter 126A that act as two stages of polarization rotators for polarization demultiplexing. Thus, the polarization controller 118 may be configured to not have endless polarization tracking. Stated another way, the polarization controller 118 has non-endless polarization tracking.

Additionally, the polarization controller 118 may not include redundant phase shifters. For example, in some embodiments, the polarization controller 118 may include only two phase shifters 126A and 126B. In these and other embodiments, one of the two phase shifters 126A or 126B may be configured to reset and the other of the two phase shifters 126A or 126B may be configured to not reset. When one of the phase shifters 126A or 126B resets, a burst of errors may be communicated through the polarization controller 118.

By reducing the number of phase shifters 126, the complexity of the polarization controller 118 and an associated system configured to control the phase shifters 126 (e.g., controller 252 of FIGS. 2A and 2B) may be reduced. For example, by including two phase shifters 126, the associated system may not require a phase unwinding algorithm. The reduction in phase shifters 126 may also reduce the insertion losses when compared to polarization controllers including four phase shifters and/or endless polarization tracking.

In some embodiments, the PBS 120, the polarization controller 118, or some portions thereof may be implemented as a photonic integrated circuit (PIC) 122. The PIC 122 may be constructed using silicon photonics, indium phosphide, or any other suitable materials.

The demultiplexed signals 168 output by the polarization controller 118 may be communicated to an optical 90-degree hybrid (90-degree hybrid) 128. The 90-degree hybrid 128 may communicate in-phase (I) optical signals and quadrature (Q) optical signals to one or more p-i-n photodetectors 130A-130D (generally, PD 130 or PDs 130). The PDs 130 may be organized into balanced pairs in some embodiments. The PDs 130 may convert the optical signals to electrical signals, which may be processed by a digital signal processing (DSP) module 132.

The DSP module 132 may be followed by an FEC decoder module 134. The FEC decoder module 134 may be configured to correct bursts of errors during phase resets of the phase shifters 126 (e.g., the first phase shifter 126A). The FEC decoder module 134 may use any suitable FEC code designed for burst error correction capability. In an example of the receiver 104, each phase reset may be about 10 to about 100 times slower than the symbol (or baud) rate. The FEC decoder module 134 may correct bursts of errors during phase resets.

Accordingly, in some embodiments of the receiver 104, the polarization controller 118 is configured to have a non-endless tracking. When the phase shifter 126 (e.g., the first phase shifter 126A) resets, a burst of errors may result. The burst of errors is corrected by the FEC decoder module 134. Thus, in these and other embodiments, the receiver 104 may be simplified by omitting components such as multiple other phase shifters, but may still sufficiently communicate the data encoded in the optical signal.

In some embodiments, the link 100 may represent one of multiple wavelength channels that may be multiplexed onto a fiber in a wavelength division multiplex (WDM) system such as a dense wavelength division multiplex (DWDM) system. For example, an implementation of the link 100 may include a metro DWDM system. The metro DWDM system may be configured to communicate the optical signals hundreds of kilometers (km). In embodiments of the link 100 that are implemented in a metro DWDM system, one or more optical amplifiers may be included to compensate for the fiber transmission losses. For instance, the metro DWDM system may communicate the optical signals about 80 to about 100 km in a single un-amplified link or multiple spans of about 80 to about 100 km may be traversed with optical amplifiers in each span. Multiplexing multiple wavelength channels in the DWDM system may be performed by DWDM equipment such as transmission/multiplexing equipment, reconfigurable optical add-drop multiplexer (ROADM) or other suitable equipment, along the link 100. In some embodiments, the link 100 may also be configured to reduce chromatic dispersion of the optical signals, which may develop as the optical signals are communicated along the link 100. In these and other embodiments, the link 100 may include optical dispersion compensating fibers, optical dispersion compensating filters. Some additional details of a WDM system are provided with reference to FIG. 3.

Figure 2A:
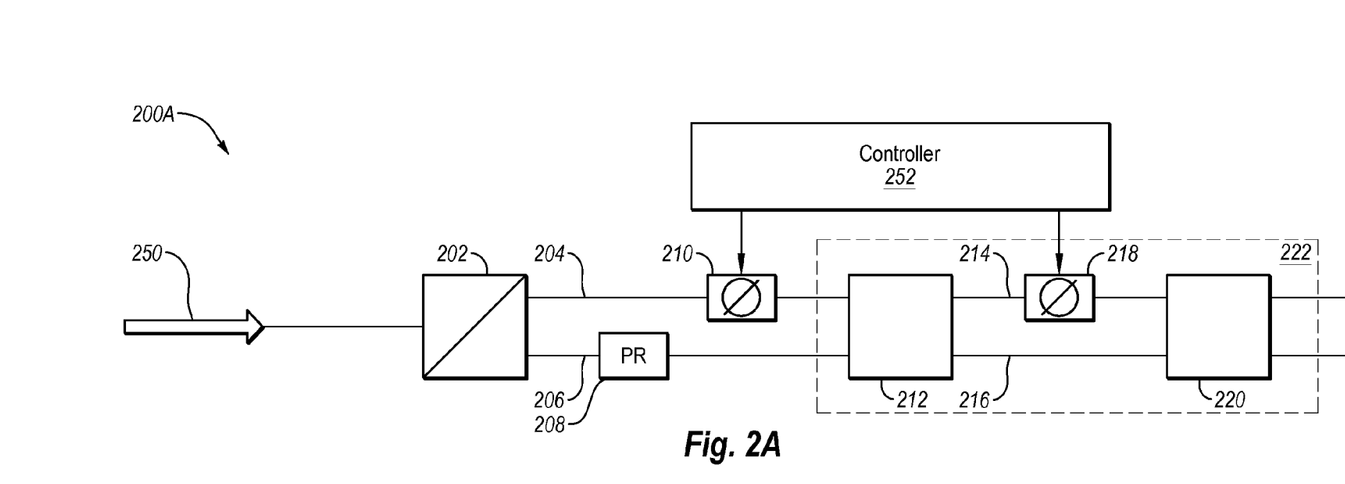
FIG. 2A illustrates a block diagram of example polarization controllers that may be implemented in the communication link of FIG. 1.
Figure 2B:
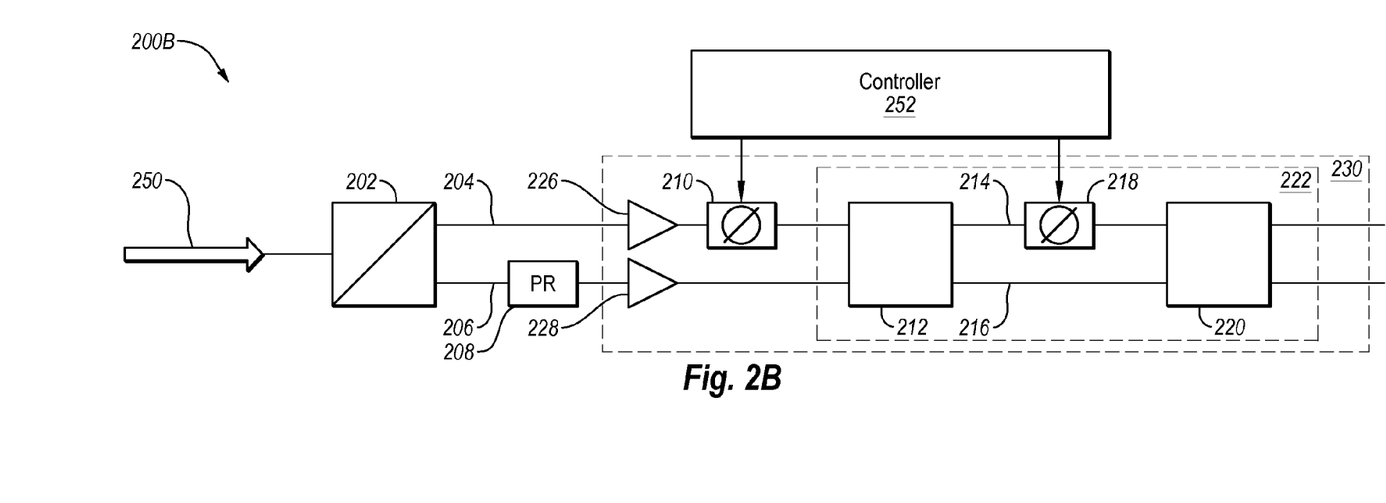
FIG. 2B illustrates block diagram of another example polarization controllers that may be implemented in the communication link of FIG. 1.

FIGS. 2A and 2B illustrate block diagrams of example polarization controllers 200A and 200B that may be implemented in the link 100 of FIG. 1. Specifically, in some embodiments, the polarization controllers 200A or 200B may correspond to the polarization controller 118 discussed with reference to FIG. 1. The polarization controllers 200A and 200B may be configured to reduce the insertion losses associated with demultiplexing an optical signal 250 having an unknown polarization state as compared to polarization controllers with endless polarization control and/or redundant phase shifters. The optical signal 250 may correspond to optical signal generated by the transmitter 102 of FIG. 1 and communicated via the SMF 106 of FIG. 1, for example.

The optical signal 250 may be communicated to a PBS 202. The PBS 202 may include a 2-D grating coupling, for instance, or any other suitable beam splitter. The PBS 202 may be coupled to a first waveguide 204 and to a second waveguide 206. The PBS 202 may output orthogonal polarizations (x'-polarization and y'-polarization). The first and second signals may be substantially similar to the x'-polarization 166A and the y'-polarization 166B described with reference to FIG. 1.

The PBS 202 may output the x'-polarization and the y'-polarization to the first waveguide 204 and to the second waveguide 206. For example, the x'-polarization may be output to the first waveguide 204 and the y'-polarization may be output to the second waveguide 206 or vice versa.

In some embodiments, the x'-polarization or the y'-polarization may include a transverse electric polarization and the other of the x'-polarization or the y'-polarization may include a transverse magnetic polarization. In these and other embodiments, the polarization having the transverse magnetic polarization may be communicated to a polarization rotator (PR) 208 that may rotate the polarization to a transverse electric polarization. In some embodiments, both the x'-polarization and the y'-polarization may have transverse electric polarizations at the first and second waveguides 204 and 206.

The x'-polarization and the y'-polarization may be represented as [X' Y'], which may be referred to as a received signal vector. An x-polarization (e.g., 112 of FIG. 1) and a y-polarization (e.g., 110 of FIG. 1) included in a transmitted optical signal and defined in relationship to a coordinate system of a transmitter may be represented as [X Y], which may be referred to as a transmitted signal vector.

Accordingly, a goal of the polarization controllers 200A and 200B is to demultiplex the received signal vector [X' Y'] into the transmitted signal vector [X Y]. Demultiplexing the received signal vector [X' Y'] may be accomplished in two stages. A first stage may include applying a differential phase shift using a first phase shifter 210. A second stage may include using an optical network 222 including two couplers 212 and 220, which may include 50/50 splitters or another coupler/mixer, and a second phase shifter 218. The polarization controllers 200A and 200B are configured to perform a first polarization rotation controlled at least partially by the first phase shifter 210 and the second polarization rotation controlled at least partially by the second phase shifter 218.

The action of the first phase shifter 210 may include rotation the received signal vector [X' Y'] and/or the x'-polarization or the y'-polarization on the first waveguide 204 according to a first rotation matrix:

$$\begin{pmatrix} e^{-j\frac{\phi_1}{2}} & 0 \\ 0 & e^{j\frac{\phi_1}{2}} \end{pmatrix}$$

In the first rotation matrix, e represents Euler's number (i.e., 2.71 . . . ). The parameter j represents the imaginary number (i.e., $j^2=-1$). The variable $\Phi_1$ represents a first phase rotation angle. The first phase rotation angle $\Phi_1$ may be controlled and varied by a controller 252. Generally, the first phase rotation angle $\Phi_1$ may be reset when the phase rotation angle $\Phi_1$ exceeds a range of about 0 to about $2\pi$.

For example, when one end (e.g., 0 or $2\pi$) of the range is exceeded, the first phase shifter 210 may be reset to an opposite end of the range. For instance, when the first phase shifter 210 exceeds the range by increasing above $2\pi$, the first phase shifter 210 may be reset to 0 and when the first phase shifter 210 exceeds the range by decreasing below 0, the first phase shifter may be reset to $2\pi$. During the reset time period, a burst of errors may result. The burst of errors may result, for instance, due to improperly demultiplexed signals. As discussed with reference to FIG. 1, the burst of errors may be corrected using an FEC decoder module such as the FEC decoder module 134 of FIG. 1.

In some embodiments, the first phase shifter 210 may include a phase modulator. The phase modulator may be configured to reset at a rate of about ten to about one hundred symbol periods, which may minimize the burst of errors resulting from resetting the phase modulator. Again, the burst of errors resulting from resetting the phase modulator may be corrected using the FEC decoder module.

In some embodiments, a first polarization rotation may be implemented by applying a differential phase shift in the waveguides 204 and 206 to achieve the first rotation matrix shown above. For example, in some embodiments the first polarization rotator may include a structure as described in Möller, Lothar, *WDM Polarization Controller in PLC Technology*, IEEE PHOTONICS TECHNOLOGY LETTERS, Vol. 13, No. 6, June 2001, which is incorporated herein by reference in its entirety.

Rotatation the received signal vector [X' Y'] and/or the x'-polarization or the y'-polarization on the first waveguide 204 according to a first rotation matrix may generate a phase-shifted first signal. The phase-shifted first signal may exit the first phase shifter 210 and enter a first coupler 212, which may be included in the optical network 222. Additionally, the x'-polarization or the y'-polarization on the second waveguide 206 or exiting PR 208 (or amplifier 228 discussed below) may enter the first coupler 212.

A vector representing the phase-shifted first signal and the x'-polarization or the y'-polarization received by the first coupler 212 may be represented as a first output vector [X" Y"]. The first coupler 212 may include a 2×2, 50/50 splitter. Accordingly, the first coupler 212 may receive the phase-shifted first signal and the x'-polarization or the y'-polarization received by the first coupler 212 and may output a third signal and a fourth signal. The third signal and the fourth signal may include some combination phase-shifted first signal and the x'-polarization or the y'-polarization received by the first coupler 212. For instance, in embodiments in which the first coupler 212 includes the 2×2, 50/50 splitter each of the third signal and the fourth signal may include 50% of the phase-shifted first signal and 50% the x'-polarization or the y'-polarization received by the first coupler 212. The third signal may be output to a third waveguide 214 and the fourth signal may be output to a fourth waveguide 216.

The third signal may be communicated to a second phase shifter 218 which may be configured to apply a phase shift. The phase-shifted third signal exiting the second phase shifter 218 and the fourth signal on the fourth waveguide 216 may be communicated to a second coupler 220. The second coupler 220 may output a fifth signal and a sixth signal that are some combination of the phase-shifted third signal and the fourth signal. For instance, in some embodiments, the second coupler 220 may include a 2×2, 50/50 splitter. Accordingly, the second coupler 220 may receive the phase-shifted third signal and the fourth signal and may output the fifth signal and the sixth signal, each including 50% of the phase-shifted third signal and 50% of the fourth signal. The fifth and the sixth signals represent demultiplexed polarizations of the optical signal 250 that are substantially similar to the transmitted signal vector [X Y].

A result of the optical network 222 (i.e., the combination of the first coupler 212, the second phase shifter 218, and the second coupler 220) may include a rotation the first output vector [X" Y"] according to a second rotation matrix:

$$\begin{pmatrix} \cos\left(\frac{\phi_2}{2}\right) & -j\sin\left(\frac{\phi_2}{2}\right) \\ -j\sin\left(\frac{\phi_2}{2}\right) & \cos\left(\frac{\phi_2}{2}\right) \end{pmatrix}$$

As already discussed, the j represents the imaginary number (i.e., $j^2=-1$). The parameter $\Phi_2$ represents a second phase rotation angle.

The second phase rotation angle $\Phi_2$ may be controlled and varied by the controller 252. In some embodiments, the second rotation angle $\Phi_2$ may be kept in a range of about 0 to about π. Accordingly, in these and other embodiments, the second phase shifter 218 may not be configured to reset. The second phase shifter 218 may include a thermal-optic phase shifter or a phase modulator.

With combined reference to FIGS. 1-2B, the demultiplexed polarizations of the optical signal 250 (e.g., the fifth signal and the sixth signal that exit the second coupler 220) may include or be substantially equivalent to the x-polarization 112 and the y-polarization 110. Specifically, the fifth signal may represent the x-polarization 112, which may include a data signal such as the QPSK data modulated thereon. Additionally, the sixth signal may represent the y-polarization 110, which may include the pilot carrier signal encoded thereon. In an example embodiment, the fifth signal and the sixth signal may be communicated to, e.g., the 90-degree hybrid 128 of FIG. 1 for further processing as already described above such that the data encoded on the optical signals 250 may be received and processed.

In some embodiments, the second phase shift, which may be performed by the optical network 222, may be applied in a differential fashion to both waveguides 214 and 216 to achieve the second rotation matrix shown above.

In some embodiments, the polarization controllers 200A and 200B may include only two phase shifters 210 and 218 (as opposed to more than two) and only two couplers 212 and 220 (as opposed to more than two). The two phase shifters 210 and 218 and the two couplers 212 and 220 may be sufficient to transform any polarization state of the x'-polarization and/or the y'-polarization to any other polarization state. This configuration is specifically and explicitly included in some embodiments. This configuration may result in a burst of errors during phase resets which are corrected using the FEC decoder module 134 as described above.

In some embodiments, the polarization controller 118 may be constructed using one or more of bulk optics and PIC. For example, the phase shifters 210 and 218, the couplers 212 and 220, the PBS 202, the PR 208, the waveguides 204, 206, 214, and 216 or some combination thereof may be included in a PIC. The PIC may be constructed using silicon photonic technologies, for instance. Additionally or alternatively, one or more of the PBS 202, the PR 208, and the waveguides 206 and 204 may be constructed of bulk optics.

With reference to FIG. 2B, a second polarization controller 200B may be substantially similar to the first polarization controller 200A as described herein. In addition, the second polarization controller 200B, may include a first semiconductor optical amplifier (SOA) 226 between the PBS 202 and the first phase shifter 210. Additionally or alternatively, the second polarization controller 200B may include a second SOA 228 between the PR 208 and the first coupler 212. The first and second SOAs 226 and 228 may be configured to amplify the x'-polarization and the y'-polarization. For example, before the x'-polarization and/or the y'-polarization enters the first phase shifter 210, the first SOA 226 may amplify the x'-polarization and/or the y'-polarization. Likewise, before the x'-polarization and/or the y'-polarization enters the first coupler 212, the second SOA 228 may amplify the x'-polarization and/or the y'-polarization.

Additionally, in the second polarization controller 200B, the first and second SOAs 226 and 228, the first and second phase shifters 210 and 218, the first and second couplers 212 and 202 and waveguides therebetween may be included in a PIC 230. The PIC 230 may be constructed using indium phosphide (InP) or other suitable material(s). Additionally, with combined reference to FIGS. 1 and 2B, in some embodiments, the PIC 230 may include the 90-degree hybrid 128 and/or the PDs 130. In these and other embodiments, the PBS 202 and the PR 208 may be constructed of bulk optics. In some embodiments of the second polarization controller 200B, the first and the second phase shifters 210 and 218 may include phase modulators. The phase modulators may have similar functions as the phase modulators described with respect to FIG. 2A.

Figure 3:
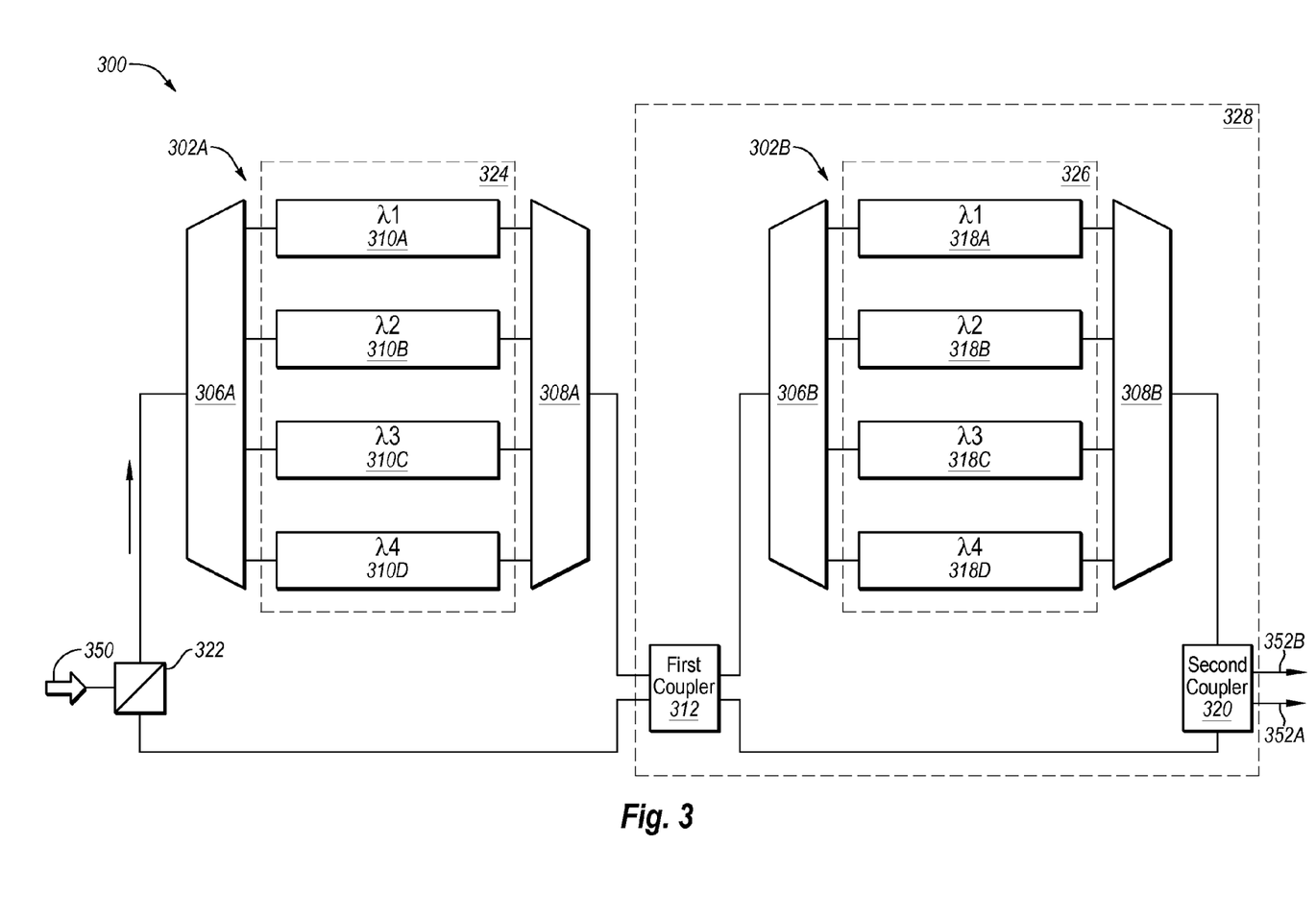
FIG. 3 illustrates a block diagram of an example wavelength division multiplex polarization controller.

FIG. 3 illustrates a block diagram of an example WDM polarization controller 300. The WDM polarization controller 300 may be included in and/or be suitable for polarization control in a WDM system (not shown). The WDM system may include multiple links similar to the link 100 of FIG. 1. In addition to components included in FIG. 1, the WDM system may include a multiplexer configured to multiplex multiple optical signals (e.g., the optical signals of FIG. 1) having differing wavelengths into a WDM signal 350. The WDM signal 350 is communicated along a SMF (e.g., the SMF 106 of FIG. 1) or a multi-mode fiber (MMF). Additionally, the WDM system may include a demultiplexer configured to separate the WDM signal 350 into multiple wavelength channels. After being separated by the demultiplexer, the data (e.g., QPSK data) on each wavelength channel may be received and processed. An example WDM system in which the WDM polarization controller 300 may be implemented may be a DWDM system or a metro DWDM system having one or more DWDM components.

In some embodiments, the WDM signal 350 may include one or more wavelength channels. The wavelength channels may each have a data signal (e.g., QPSK data) modulated on a first polarization and a pilot carrier signal encoded on a second polarization. The first polarization and the second polarization may be defined according to a coordinate system of a transmitter, similar to the x-polarization 112 and y-polarization 110 discussed elsewhere herein. The WDM signal 350, when received at the WDM polarization controller 300 may include an unknown polarization state.

The WDM polarization controller 300 may be configured to receive the WDM signal 350 and perform a polarization demultiplexing of each of the wavelength channels such that the data signal of each of the wavelength channels may be interpreted using the pilot carrier signal at a WDM receiver (not shown, but similar to the receiver 104 of FIG. 1). In the WDM polarization controller 300, the polarization control may be non-endless, thus bursts of errors may occur during reset of one or more wavelength parallel phase shifters (described below). The bursts of errors may be corrected using an FEC decoder module (e.g., the FEC decoder module 134 of FIG. 1).

The WDM polarization controller 300 may operate similarly to the polarization controllers 200A and 200B of FIGS. 2A and 2B. For example, a goal of the WDM polarization controller 300 is to demultiplex an x'-polarization and a y'-polarization, which may be defined in accordance with a coordinate system of a receiver, of each of the wavelength channels into transmitted polarizations x-polarization and y-polarization.

The WDM polarization controller 300 is configured to perform a first polarization rotation of each of the wavelength channels controlled by first wavelength selectable phase shifters 302A and a second polarization rotation of each of the wavelength channels controlled by the second wavelength selectable phase shifters 302B. In some embodiments, the WDM polarization controller 300 may implement differential phase shifting as discussed elsewhere herein.

A difference between the polarization controllers 200A and 200B of FIGS. 2A and 2B and the WDM polarization controller 300 is a substitution of wavelength selectable phase shifters 302A and 302B (generally, wavelength selectable phase shifter 302 or wavelength selectable phase shifters 302) for the phase shifters 210 and 218 of FIGS. 2A and 2B. The wavelength selectable phase shifters 302 may be configured to perform phase rotations similar to that described with reference to the phase shifters 210 of FIGS. 2A and 2B or be included in an optical network 328 which may perform a phase rotation along with a first coupler 312 and a second coupler 320 similar to the optical network 222 of FIGS. 2A and 2B. The wavelength selectable phase shifters 302 however, are performed on each of the wavelength channels included in the WDM signal 350.

Specifically, in the depicted WDM polarization controller 300 of FIG. 3, the WDM signal 350 having an unknown polarization state may be separated into orthogonal polarizations at a PBS 322. The orthogonal polarizations may include an x'-polarization and a y'-polarization. Either the x'-polarization or the y'-polarization may be communicated from the PBS 322 to a first optical demultiplexer 306A of a first wavelength selectable phase shifter 302A. The first optical demultiplexer 306A may separate the x'-polarization or the y'-polarization output from the PBS 322 into wavelength channels ($\lambda_1$-$\lambda_4$ in FIG. 3). The wavelength channels may be communicated through a first array of parallel phase shifters 324. The first array of parallel phase shifters 324 may include multiple parallel phase shifters (individually labeled in FIG. 3 as 310A-310D, collectively referred to as parallel phase shifters 310) that may each receive one of the wavelength channels. Specifically, a first wavelength channel $\lambda_1$ may be communicated to a first of the parallel phase shifters 310A, a second wavelength channel $\lambda_2$ may be communicated to a second of the parallel phase shifters 310B, etc.

Each of the parallel phase shifters 310 may be substantially similar to the first phase shifter 210 of the polarization controllers 200A and 200B of FIGS. 2A and 2B. For example, each of the parallel phase shifters 310A-310D may apply a differential phase shift to each of the received wavelength channels. In some embodiments, each of the parallel phase shifters 310 may rotate one of the received wavelength channels by the first rotation matrix described above. The rotation that results from the parallel phase shifters 310 may be based on one or more phase rotation angles, which may be controlled and/or varied by a controller (e.g., the controller 252 of FIGS. 2A and 2B).

One or more of the phase rotation angles of the parallel phase shifters 310 may be reset when the phase rotation angles exceed a range of about 0 to about $2\pi$. For example, when one end of a range of one of the phase rotation angles is exceeded, the parallel phase shifters 310 may be reset to an opposite end of the range. During the reset time period, a burst of errors may result. The burst of errors may result, for instance, due to improperly demultiplexed signals. As discussed with reference to FIG. 1, the burst of errors may be corrected using an FEC decoder module such as the FEC decoder module 134 of FIG. 1.

Rotation of the wavelength channels may generate phase-shifted wavelength channels. The phase-shifted wavelength channels may then be multiplexed by a first optical multiplexer 308A of the first wavelength selectable phase shifters 302A. The multiplexed, phase-shifted wavelength channels may proceed to a first coupler 312. The first coupler 312 may include a 2×2 50/50 splitter, for instance. The first coupler 312 may output two intermediate signals. The two intermediate signals may include a combination (e.g., 50/50) of the multiplexed, phase-shifted wavelength channels with the x'-polarization or the y'-polarization output from the PBS 322 that did not enter the first optical demultiplexer 306A.

A first intermediate signal of the two intermediate signal that are output from the first coupler 312 may be communicated to a second demultiplexer 306B of the second wavelength selectable phase shifters 302B. The second demultiplexer 306B may separate the first intermediate signal output from the first coupler 312 into the multiple wavelength channels ($\lambda_1$-$\lambda_4$ in FIG. 3). The wavelength channels may be communicated through a second array of parallel phase shifters 326.

The second array of parallel phase shifters 326 may include multiple parallel phase shifters (individually, labeled in FIG. 3 as 318A-318D, collectively referred to as second parallel phase shifters 318) that may each receive one of the wavelength channels. Specifically, a first wavelength channel $\lambda_1$ may be communicated to a first of the second parallel phase shifters 318A, a second wavelength channel $\lambda_2$ may be communicated to a second of the second parallel phase shifters 318B, etc.

One or more of the second parallel phase shifters 318A-318D may be substantially similar to the second phase shifter 218 of the polarization controllers 200A and 200B of FIGS.

2A and 2B. Each of the second parallel phase shifters 318A-318D may apply a phase shift to one of the wavelength channels. Phase-shifted wavelength channels output by the second parallel phase shifters 318A-318D may be multiplexed by a second multiplexer 308B.

The phase-shifted, multiplexed signal exiting the second wavelength selectable phase shifter 302B and a second intermediate signal of the two intermediate signals exiting the first coupler 312 may be communicated to a second coupler 320. The second coupler 320 may receive the phase-shifted, multiplexed signal output from the second multiplexer 308B and the second intermediate signal output from the first coupler 312. The second coupler 320 may output demultiplexed signals 352A and 352B. Each of the demultiplexed signals 352A and 352B may include a combination of the phase-shifted, multiplexed signal output from the second multiplexer 308B and the second intermediate signal output from the first coupler 312. For example, the second coupler 320 may include a 2×2, 50/50 splitter. Accordingly, each of the demultiplexed signals 352A and 352B may include 50% of the phase-shifted, multiplexed signal and 50% of the second intermediate signal.

A result of the optical network 328 (i.e., the combination of the first coupler 312, the second wavelength selectable phase shifter 302B, and the second coupler 320) may include rotation of each of the wavelength channels according to the second rotation matrix described above. One or more second phase rotation angles included in the second rotation matrix may be controlled and varied by a controller (e.g., 252 of FIGS. 2A and 2B). In some embodiments, the second rotation angle applied to each of the wavelength channels may be kept in a range of about 0 to about $\pi$. The demultiplex signals 352A and 352B may include channel wavelengths having polarizations that are substantially similar to transmitted polarizations x-polarization and y-polarization on which data signals may be modulated and a pilot carrier signal may be encoded.

The WDM polarization controller 300 of FIG. 3 includes four parallel phase shifters 310 and 318 in each of the wavelength selectable phase shifters 302. In some embodiments, the wavelength selectable phase shifters 302 may include more than four or fewer than four parallel phase shifters 310. These embodiments may be implemented in WDM systems including more than four or fewer than four wavelength channels.

Figure 4:
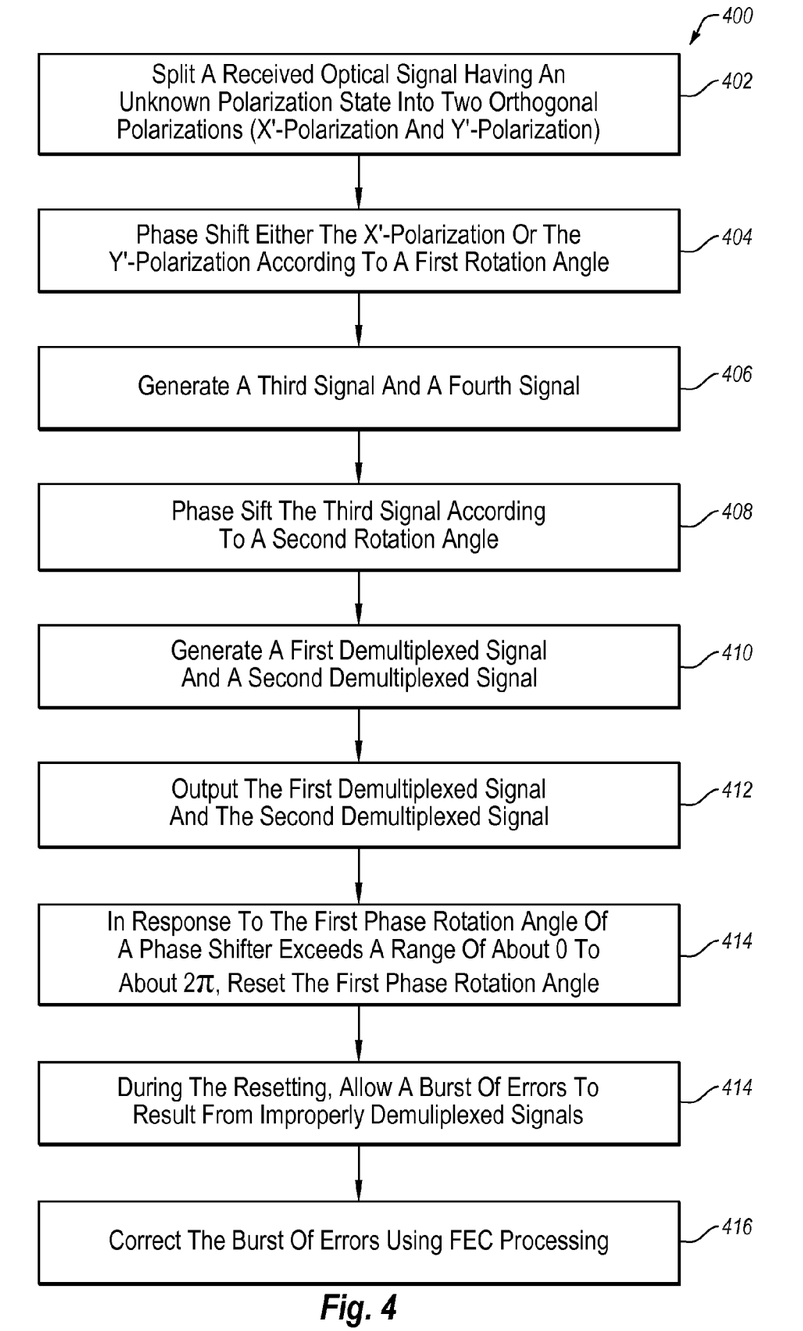
FIG. 4 is a flowchart of an example method of polarization demultiplexing, all in accordance with at least one embodiment described herein.

FIG. 4 depicts a flowchart of an example method 400 of polarization demultiplexing, in accordance with at least one embodiment described herein. The polarization demultiplexing may be performed on an optical signal such as the optical signal discussed elsewhere herein. For example, the optical signal may include QPSK data modulated on a first polarization and a pilot carrier signal encoded on a second polarization. The first polarization and the second polarization may be defined with respect to a transmitter such as the x-polarization 112 and the y-polarization of FIG. 1. The first polarization may be orthogonal to the first polarization.

The method 400 may be performed in a communication link such as the link 100 of FIG. 1. For example, the method 400 may be performed in some embodiments by the receiver 104 or one or more components included therein. The receiver 104 or one or more components included therein may include non-transitory computer-readable medium having stored thereon programming code or instructions that are executable by a computing device to cause the computing device to perform the method 400 or some portion thereof. Additionally or alternatively, the receiver 104 may include a processor that is configured to execute computer instructions to cause a computing system to perform or control performance of the method 400 or some portion thereof. Although illustrated as discrete blocks, various blocks may be divided into additional blocks, combined into fewer blocks, or eliminated, depending on the desired implementation.

The method 400 may begin at block 402. At block 402, a received optical signal having an unknown polarization state may be split into two orthogonal polarizations (x'-polarization and y'-polarization). For example a PBS may split the optical signal having an unknown polarization state into the x'-polarization and the y'-polarization. At block 404 a phase of either the x'-polarization or the y'-polarization may be shifted according to a first rotation angle. In some embodiments, shifting the phase of the x'-polarization or the y'-polarization may include differential phase shifting. In some embodiments, the shifting the phase of the x'-polarization or the y'-polarization may include rotating the SOP of the x'-polarization or the y'-polarization by a first rotation matrix. The first rotation matrix may include:

$$\begin{pmatrix} e^{-j\frac{\phi_1}{2}} & 0 \\ 0 & e^{j\frac{\phi_1}{2}} \end{pmatrix};$$

In the first rotation matrix, e represents Euler's number, j represents the imaginary number; and $\Phi_1$ represents the first phase rotation angle.

At block 406, a third signal and a fourth signal may be generated. In some embodiments one or both of the third signal and the fourth signal may include a combination of a phase shifted first signal and the other of the x'-polarization or the y'-polarization. For instance if at block 404 x'-polarization is phase shifted, then the third signal and the fourth signal may include a combination of the phase shifted x'-polarization and the y'-polarization. Alternatively, if at block 404 y'-polarization is phase shifted, then the third signal and the fourth signal may include a combination of the phase shifted y'-polarization and the x'-polarization.

At block 408, a phase of the third signal may be shifted according to a second rotation angle. In some embodiments, shifting the phase of the third signal may include differential phase shifting. In some embodiments, shifting the phase of the third signal may include rotating the phase shifted first signal by a second rotation matrix. The second rotation matrix may include:

$$\begin{pmatrix} \cos\left(\frac{\phi_2}{2}\right) & -j\sin\left(\frac{\phi_2}{2}\right) \\ -j\sin\left(\frac{\phi_2}{2}\right) & \cos\left(\frac{\phi_2}{2}\right) \end{pmatrix}$$

In the second rotation matrix, e represents Euler's number, j represents the imaginary number; and $\Phi_2$ represents the second phase rotation angle.

At block 410, a first demultiplexed signal and a second demultiplexed signal may be generated. One or both of the first demultiplexed signal and the second demultiplexed signal may include a combination of a phase shifted third signal and the fourth signal. At block 412, the first demultiplexed signal and the second demultiplexed signal may be output. For example, the first demultiplexed signal and the second demultiplexed signal may be output to a 90 degree hybrid.

At block 414, in response to the first phase rotation angle of a phase shifter exceeds a range of about 0 to about $2\pi$, the first phase rotation angle may be reset. At block 416 during the resetting, a burst of errors may be allowed to result from improperly demultiplexed signals. At block 418, the burst of errors may be corrected using FEC processing.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, the method 400 may include separating the x'-polarization or the y'-polarization into a plurality of wavelength channels. In these and other embodiments, the phase shifting the x'-polarization or the y'-polarization may include phase shifting each of the plurality of wavelength channels. Additionally or alternatively, the method 400 may include separating the third signal into the plurality of wavelength channels. In these and other embodiments, the phase shifting of the third signal may include phase shifting each of the plurality of wavelength channels.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An optical receiver comprising:
 a polarization beam splitter (PBS) configured to split a received optical signal having an unknown polarization state into two orthogonal polarizations (x'-polarization and y'-polarization);
 a polarization controller configured to have a non-endless polarization tracking, wherein:
  the polarization controller includes only two couplers and only two phase shifters per wavelength channel of the x'-polarization and the y'-polarization,
  the polarization controller is configured to demultiplex the x'-polarization and the y'-polarization into a first demultiplexed signal having a first polarization on which a data signal is modulated and a second demultiplexed signal having a second polarization that is orthogonal to the first polarization,
  a first phase shifter of the two phase shifters is configured to be reset when a first phase rotation angle exceeds a range of about 0 to about $2\pi$, and
  a second phase shifter of the two phase shifters is configured to maintain a second phase rotation angle between about 0 and about $\pi$; and
 a forward error correction (FEC) decoder module configured to correct a burst of errors resulting from resetting one of the phase shifters based on error correction code (ECC) data encoded in the data signal.

2. The optical receiver of claim 1, wherein the data signal modulated on the first demultiplexed signal includes data modulated using single polarization quadrature phase shift keying (QPSK).

3. The optical receiver of claim 1, wherein the first phase shifter is configured rotate at least one wavelength channel of one of the x'-polarization or the y'-polarization by a first rotation matrix:

$$\begin{pmatrix} e^{-j\frac{\phi_1}{2}} & 0 \\ 0 & e^{j\frac{\phi_1}{2}} \end{pmatrix};$$

in which:
e represents Euler's number;
j represents the imaginary number; and
$\Phi_1$ represents the first phase rotation angle.

4. The optical receiver of claim 3, wherein:
 a first of the couplers is configured to receive a phase-shifted signal output by the first phase shifter and the other of the x'-polarization or the y'-polarization and output a third signal and a fourth signal; and
 each of the third signal and the fourth signal include a portion of the phase-shifted signal and a portion the x'-polarization or the y'-polarization that is received by the first of the couplers.

5. The optical receiver of claim 4, wherein the second phase shifter and one or both of the couplers are configured to rotate the phase-shifted signal output by the first phase shifter according to a second rotation matrix:

$$\begin{pmatrix} \cos\left(\frac{\phi_2}{2}\right) & -j\sin\left(\frac{\phi_2}{2}\right) \\ -j\sin\left(\frac{\phi_2}{2}\right) & \cos\left(\frac{\phi_2}{2}\right) \end{pmatrix};$$

in which $\Phi_2$ represents the second phase rotation angle.

6. The optical receiver of claim 1, wherein the polarization controller includes:
a first demultiplexer coupled to the PBS that is configured to separate one of the x'-polarization or the y'-polarization into a plurality of wavelength channels;
a first array of wavelength parallel phase shifters that includes one phase shifter for each of the plurality of wavelength channels, wherein the first array of wavelength parallel phase shifters is in optical communication with the first demultiplexer;
a first multiplexer that is configured to receive a plurality of phase-shifted signals from the first array of wavelength parallel phase shifters and to combine the plurality of phase-shifted signals;
a second demultiplexer that is configured to receive a first intermediate signal from a first of the couplers and to separate the intermediate signal into the plurality of wavelength channels, wherein the intermediate signal includes a mix of the phase-shifted wavelength channels signal and other of the x'-polarization or the y'-polarization;
a second array of wavelength parallel phase shifters that includes one phase shifter for each of the plurality of wavelength channels; and
a second multiplexer that is configured to receive a plurality of phase-shifted signals from the second array of wavelength parallel phase shifters, to combine the plurality of phase-shifted signals, and communicate a combined signal to the second of the couplers.

7. The optical receiver of claim 1, wherein:
one or both of the phase shifters include a phase modulator;
one or both of the couplers includes a 2×2, 50/50 splitter; and
at least some portion of the polarization controller is a photonic integrated circuit (PIC) constructed of silicon photonics or indium phosphide.

8. The optical receiver of claim 1, further comprising one or more semiconductor optical amplifiers configured to amplify at least one of the x'-polarization or the y'-polarization.

9. The optical receiver of claim 1, further comprising:
an optical 90-degree hybrid; and
one or more p-i-n photodetectors,
wherein the phase shifters, the couplers, the one or more p-i-n photodetectors, and the optical 90-degree hybrid are integrated in an indium phosphide photonic integrated circuit (PIC).

10. An optical communication link comprising:
an optical transmitter including a forward error correction (FEC) encoder module configured to encode error correction code (ECC) data on a data signal, a modulator configured to modulate the data signal onto a first polarization of an optical signal, a laser, and a pilot encoder module configured to encode a pilot carrier oscillator signal onto a second polarization of the optical signal, and a polarization beam combiner;
an optical receiver including:
a polarization beam splitter (PBS) that is configured to split a received optical signal having an unknown polarization state into two orthogonal polarizations (x'-polarization and y'-polarization),
a polarization controller that is configured to have a non-endless polarization tracking and that includes only two couplers and only two phase shifters, wherein a first phase shifter of the two phase shifters is configured to be reset when a first phase rotation angle exceeds a range of about 0 to about $2\pi$ and a second phase shifter of the two phase shifters is configured to maintain a second phase rotation angle between about 0 and about $\pi$; and
an FEC decoder module configured to correct a burst of errors resulting from resetting one of the phase shifters based on the ECC data encoded in the data signal; and
a fiber optically coupling the optical transmitter to the optical receiver.

11. The optical communication link of claim 10, wherein the polarization controller is configured to demultiplex the x'-polarization and the y'-polarization into a first demultiplexed signal on which the data signal is modulated and a second demultiplexed signal having a polarization that is orthogonal to the first demultiplexed signal.

12. The optical communication link of claim 10, wherein:
the data signal is modulated on the first demultiplexed signal using single polarization quadrature phase shift keying (QPSK);
the first phase shifter is configured to rotate one of the x'-polarization or the y'-polarization by a first rotation matrix:

$$\begin{pmatrix} e^{-j\frac{\phi_1}{2}} & 0 \\ 0 & e^{j\frac{\phi_1}{2}} \end{pmatrix},$$

in which e represents Euler's number; j represents the imaginary number; and $\Phi_1$ represents the first phase rotation angle;
a first of the couplers is configured to receive a phase-shifted signal output by the first phase shifter and the other of the x'-polarization or the y'-polarization and output a third signal and a fourth signal;
the second phase shifter and one or both of the couplers are configured to rotate the phase-shifted signal output by the first phase shifter according to a second rotation matrix:

$$\begin{pmatrix} \cos\left(\frac{\phi_2}{2}\right) & -j\sin\left(\frac{\phi_2}{2}\right) \\ -j\sin\left(\frac{\phi_2}{2}\right) & \cos\left(\frac{\phi_2}{2}\right) \end{pmatrix},$$

in which $\Phi_2$ represents the second phase rotation angle; and
each of the third signal and the fourth signal include a portion of the phase-shifted signal and a portion the x'-polarization or the y'-polarization received at the first of the couplers.

13. A dense wavelength division multiplex (DWDM) communication link comprising:
a DWDM multiplexer;
a DWDM demultiplexer;
one or more optical amplifiers;
one or more reconfigurable optical add-drop multiplexer (ROADMs);

a dispersion compensating module; and a plurality of DWDM wavelength channels, each of the plurality of DWDM wavelength channels including the optical communication link of claim 10.

14. A method of polarization demultiplexing using non-endless polarization tracking, the method comprising:

splitting a received optical signal having an unknown polarization state into two orthogonal polarizations (x'-polarization and y'-polarization);

phase shifting, by a first phase shifter of only two phase shifters of a polarization controller, either the x'-polarization or the y'-polarization according to a first rotation angle;

generating a third signal and a fourth signal, each of the third signal and the fourth signal being a combination of a phase shifted first signal and the other of the x'-polarization or the y'-polarization;

phase shifting, at least partially by a second phase shifter of the two phase shifters of a polarization controller, the third signal according to a second rotation angle;

generating a first demultiplexed signal and a second demultiplexed signal, each of the first demultiplexed signal and the second demultiplexed signal including a combination of a phase shifted third signal and the fourth signal;

outputting the first demultiplexed signal and the second demultiplexed signal;

in response to the first phase rotation angle of the first phase shifter exceeding a range of about 0 to about $2\pi$, resetting the first phase rotation angle;

maintaining the second phase rotation angle of the second phase shifter in a range of about 0 to about $\pi$;

during the resetting, allowing a burst of errors to result from improperly demultiplexed signals; and correcting the burst of errors using forward error correction (FEC) processing based on error correction code (ECC) data encoded in a data signal.

15. The method of claim 14, wherein the phase shifting the x'-polarization or the y'-polarization and the phase shifting the third signal includes differential phase shifting.

16. The method of claim 14, wherein the phase shifting of the x'-polarization or the y'-polarization includes rotating the state of polarization (SOP) of the x'-polarization or the y'-polarization by a first rotation matrix:

$$\begin{pmatrix} e^{-j\frac{\phi_1}{2}} & 0 \\ 0 & e^{j\frac{\phi_1}{2}} \end{pmatrix};$$

in which:

e represents Euler's number;

j represents the imaginary number; and $\Phi_1$ represents the first phase rotation angle.

17. The method of claim 16, wherein the phase shifting the third signal includes rotating the phase shifted first signal by a second rotation matrix:

$$\begin{pmatrix} \cos\left(\frac{\phi_2}{2}\right) & -j\sin\left(\frac{\phi_2}{2}\right) \\ -j\sin\left(\frac{\phi_2}{2}\right) & \cos\left(\frac{\phi_2}{2}\right) \end{pmatrix};$$

in which $\Phi_2$ represents the second phase rotation angle.

18. The method of claim 14, further comprising:

separating the x'-polarization or the y'-polarization into a plurality of wavelength channels; and separating the third signal into the plurality of wavelength channels, wherein the phase shifting the x'-polarization or the y'-polarization includes phase shifting each of the plurality of wavelength channels, and the phase shifting the third signal includes phase shifting each of the plurality of wavelength channels.

* * * * *